(12) United States Patent
Kromer

(10) Patent No.: US 7,120,633 B1
(45) Date of Patent: Oct. 10, 2006

(54) METHOD AND SYSTEM FOR AUTOMATED HANDLING OF ALARMS FROM A FAULT MANAGEMENT SYSTEM FOR A TELECOMMUNICATIONS NETWORK

(75) Inventor: Mark A. Kromer, Harleysville, PA (US)

(73) Assignee: Cingular Wireless II, LLC, Atlanta, GA (US)

( * ) Notice: Subject to any disclaimer, the term of this patent is extended or adjusted under 35 U.S.C. 154(b) by 409 days.

(21) Appl. No.: 10/630,588

(22) Filed: Jul. 30, 2003

Related U.S. Application Data

(60) Provisional application No. 60/399,900, filed on Jul. 31, 2002.

(51) Int. Cl.
*G06F 17/30* (2006.01)
(52) U.S. Cl. .......................................... 707/8
(58) Field of Classification Search ............. 707/1–10, 707/100–104.1, 200–206; 714/14; 705/1
See application file for complete search history.

(56) References Cited

U.S. PATENT DOCUMENTS 6,671,818 B1 * 12/2003 Mikurak ........................ 714/4

2003/0004744 A1 * 1/2003 Greene et al. ................. 705/1

OTHER PUBLICATIONS

Manning, Alan W., Wireless SCADA System Design Considerations, 1999, pp. 1-7, Detaradio Article, downloaded on Jul. 30, 2003 from http://www.dataradio.com/articles_7663.shtml.
Daneels, Alex and Salter, Wayne, What is SCADA?, CERN-CNL-2000-003, vol. XXXV, issue No. 3, pp. 1-11, downloaded on Jul. 30, 2003 from http://ref.cern.ch/CERN/CNL/2000/003/scada/.

* cited by examiner

*Primary Examiner*—Diane Mizrahi
(74) *Attorney, Agent, or Firm*—Gardner Groff Santos & Greenwald, P.C.

(57) ABSTRACT

A method and system provides for the automated handling of alarms from a fault management system for a telecommunications network without the need for the intervention of an operator. When the fault management system identifies service outages or other network performance problems, an alarm is generated, and an established set of rules is applied to evaluate the alarm based on certain attributes of the alarm. From this application of the rules, an action is identified and initiated, which could involve any of a number of tasks or activities, including, for example, transmission of instructions directly to a network device, electronic notifications directly to a technician or other maintenance personnel, and/or generation of a trouble ticket.

15 Claims, 1 Drawing Sheet

METHOD AND SYSTEM FOR AUTOMATED HANDLING OF ALARMS FROM A FAULT MANAGEMENT SYSTEM FOR A TELECOMMUNICATIONS NETWORK

CROSS-REFERENCE TO RELATED APPLICATIONS

The present application claims priority to U.S. Provisional Application Ser. No. 60/399,900 filed Jul. 31, 2002, the entire disclosure of which is incorporated herein by reference.

BACKGROUND OF THE INVENTION

1. Field of the Invention

The present invention relates to the field of telecommunications, and, more particularly, relates to a method and system for automated handling of alarms from a fault management system for a telecommunications network.

2. Description of Related Art

The present invention is a method and system for automated handling of alarms from a fault management system for a telecommunications network, thus improving the performance and efficiency of the telecommunications network.

Presently, various methods and systems are used for monitoring faults within telecommunications networks. Often, these are called fault management systems. Such fault management systems are crucial to network providers, including telecom providers and/or Internet service providers, because of the need to proactively monitor and rapidly address network performance and degradation issues. For example, Agilent Technologies, Inc. of Palo Alto, Calif. markets and distributes a software product under the trademark FM eXEL that serves as a fault management system. Specifically, this software product is designed to monitor and control network devices, such that service outages and degradations are reported to the network provider in substantially real-time. This and other software products are widely used by network providers.

Regardless of the particular fault management system selected for monitoring a network, in most cases, alarms or messages associated with network conditions are transmitted to a Network Operating Center ("NOC") established by the network provider, which is typically a centralized facility staffed by operators (e.g., technicians and engineers) trained to respond to such alarms. When a NOC operator receives an alarm from the fault management system, which is typically displayed on a computer monitor, the NOC operator must evaluate its significance. If the alarm relates to a critical component or aspect of the network, then the NOC operator will take immediate and appropriate action. For example, the NOC operator may dispatch a repair crew to the location of the problem, or the NOC operator may adjust certain network devices to compensate for an identified problem by transmitting instructions to one or more network devices. As one skilled in the art will recognize, various well-known methods and systems exist for executing such corrective actions. However, if a particular alarm is relatively insignificant, or if there are insufficient resources to deal with the alarm, or if the NOC operators are busy tending to more critical alarms, then there might be a delay in responding to a particular alarm, or the particular alarm might be completely ignored.

Because of the irregular rate and volume of alarms from a fault management system, a particular NOC may not always have the staffing necessary to address all alarms from the fault management system in a timely fashion, which may ultimately result in service degradation and decreased network performance. Alternatively, if the network provider staffs a NOC based on estimated peak periods of activity, there is an associated labor cost.

Thus, there is a need for a method and system for automated handling of alarms from a fault management system for a telecommunications network, preferably a method and system in which certain actions are initiated in response to one or more alarms from the fault management system without the need for the intervention of a NOC operator. Such a method and system would allow for the level of alarm traffic generated by a fault management system to be effectively filtered or reduced, so as to allow the NOC operators to focus their efforts on addressing more critical faults or network performance issues. Furthermore, it would be desirable that, in such a method and system for automated handling of alarms, the appropriate response to one or more alarms from the fault management system could be based on or configured to local, regional, national, and/or international network conditions.

SUMMARY OF THE INVENTION

The present invention is a method and system for automated handling of alarms from a fault management system for a telecommunications network, thus improving the performance and efficiency of the telecommunications network. In this regard, a fault management system is operably connected to the telecommunications network and monitors network performance. When the fault management system identifies service outages or other network performance problems, an alarm is generated and received into a queue. An established set of rules is applied to evaluate the alarm based on certain attributes of the alarm. Such an application of the rules essentially involves the use of a series of "If-Then" statements or similar conditional statements so that the nature of the alarm can be pinpointed and understood, and an appropriate action can then be identified for handling that alarm.

The established set of rules is stored in a database accessible to network operators or administrators for maintenance and updating. It is also contemplated that certain authorized personnel could communicate temporary, contrary instructions to this database, for example, if a maintenance crew was taking a particular network device off-line for a routine repair, it is quite likely that some sort of alarm would be generated by the fault management system. However, it may not be appropriate to take any action with respect to this alarm since it is a product of routine maintenance on the network device. Therefore, after the established set of rules is applied to evaluate the alarm, a subsequent decision is made as to whether there are any contrary instructions stored in the database. If so, no action is initiated.

If there are no contrary instructions, the identified action is initiated, which could involve any of a number of tasks or activities, including, for example, transmission of instructions directly to a network device, electronic notifications directly to a technician or other maintenance personnel, and/or generation of a trouble ticket.

Thus, the method and system of the present invention provides for the initiation and implementation of certain actions in response to one or more alarms from the fault management system without the need for the intervention of a NOC operator. These and other objects, features, and/or advantages may accrue from various aspects of embodiments of the present invention, as described in more detail below.

BRIEF DESCRIPTION OF THE DRAWINGS

Preferred and alternative embodiments will now be described with reference to the attached figure wherein like reference numerals indicate similar or identical features or functions, and wherein.

DETAILED DESCRIPTION OF THE INVENTION

Figure 1:
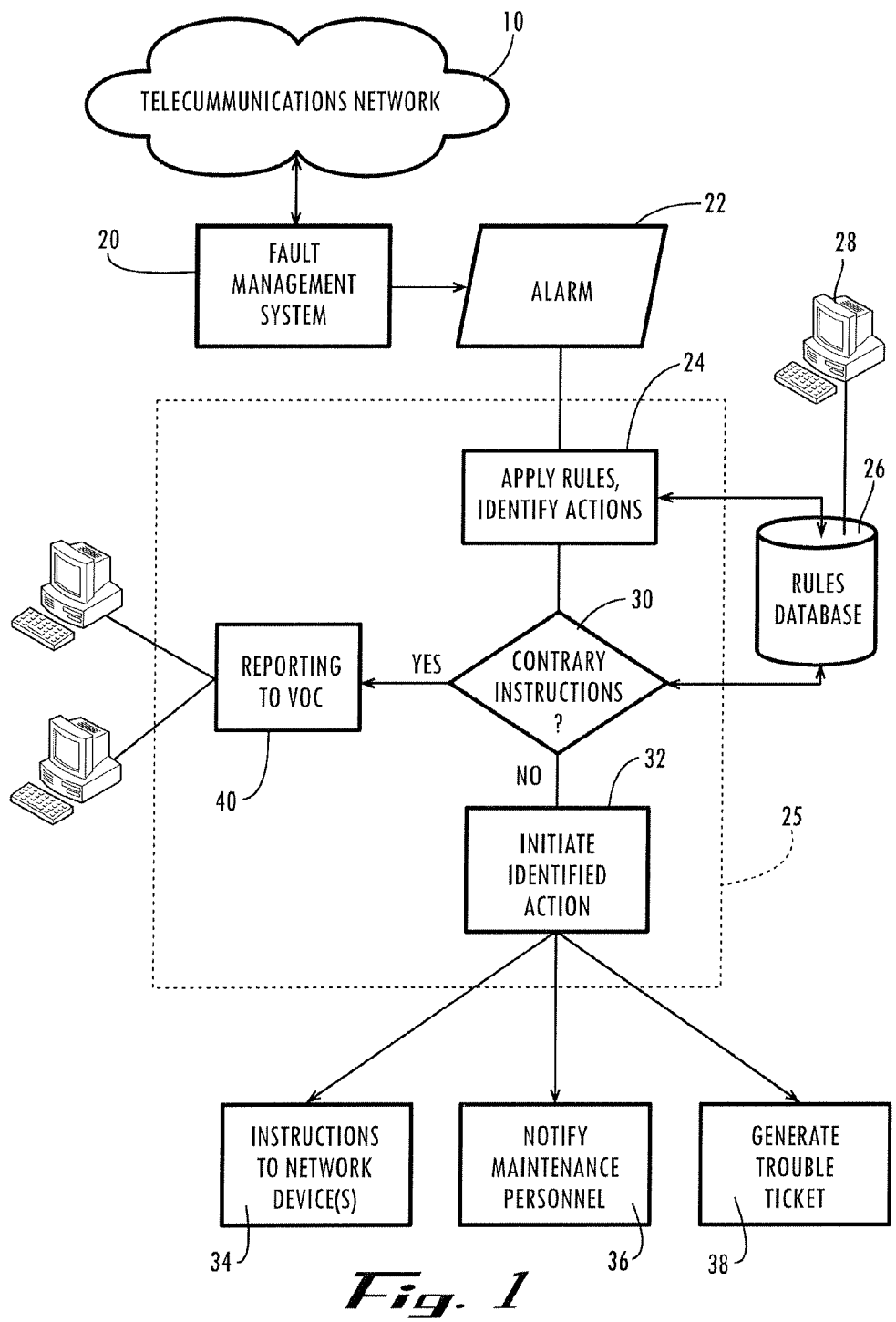
FIG. 1 is a flow chart illustrating the steps involved in an exemplary method and system for automated handling of alarms from a fault management system for a telecommunications network in accordance with the present invention.

The present invention is a method and system for automated handling of alarms from a fault management system for a telecommunications network, thus improving the performance and efficiency of the telecommunications network.

As mentioned above, various fault management systems are presently used for monitoring faults within telecommunications networks. Referring to the flow chart of FIG. 1, such a fault management system 20 is operably connected to the telecommunications network 10 and monitors network performance. When the fault management system 20 identifies service outages or other network performance problems, an alarm is generated and received into a queue, as indicated at block 22 of FIG. 1. After such an alarm is generated, an established set of rules is applied to evaluate the alarm based on certain attributes of the alarm, as indicated at block 24.

As will become clearer in the description that follows, the various logical and operational steps of the method and system of the present invention are achieved through the use of a digital computer program. Such a computer program is preferably installed and stored on a server 25.

The rules that are applied to evaluate each alarm are pre-established by a network operator or administrator. Specifically, it is contemplated that each alarm has certain attributes. For example, Table A provides a non-exhaustive list of attributes that might be used to identify or characterize a particular alarm:

TABLE A

| ATTRIBUTES |
| --- |
| Name |
| Severity Level |
| Managed Object Name |
| Alarm Description |
| Number of occurrences of the Alarm (Count) |

Thus, when the established set of rules is applied to evaluate the alarm, the individual attributes of the alarm are examined in view of the rules. Specifically, the application of the rules essentially involves the use of a series of "If-Then" statements or similar conditional statements so that the nature of the alarm can be pinpointed and understood, and an appropriate action can then be identified. In this regard, because of the nature of "If-Then" statements or similar conditional statements, each and every attribute of the alarm can be taken into account in identifying an appropriate action. For example, the determination of an appropriate response to an alarm can take into account attributes not only unique to that alarm, but also more general attributes, such as local, regional, national, and/or international network conditions at the time of the alarm.

For instance, assume that a TDMA cellular site has a radio that drops out of service and stops communicating. The fault management system 20 would generate an appropriate alarm identifying this equipment problem, for example, designating the problem as "REPT:CELL RA OOS." To determine how to address this problem, a rule might specify how many occurrences of this alarm must take place before a particular action is initiated. Specifically, the rule might provide that upon the first occurrence of the alarm, the appropriate action is to attempt to restore the radio by sending a block/unblock command to the radio. If that action fails to resolve the problem, a subsequent alarm is generated, i.e., the second occurrence of the alarm. A second rule might provide that upon the second occurrence of the alarm, the appropriate actions are to generate a trouble ticket, dispatch a technician responsible for the particular TDMA cell site, and then notify the NOC of the problem. Of course, these are but a few example of rules that might be applied, and a wide variety of rules is contemplated within the spirit and scope of the present invention. Furthermore, those skilled in the art will recognize that rules may be nested within other rules, and that a single rule may prescribe several complementary or alternative actions.

Returning to FIG. 1, the established set of rules is stored in a database 26. This database 26 is accessible to network operators or administrators for maintenance and updating. Of course, for purposes of security and data integrity, it is contemplated and preferred that passwords or similar security techniques be used to restrict access to the database 26 only to authorized users. Although access to the database 26 may be accomplished using various well-known techniques, it is contemplated and preferred that authorized users access the data through a web page or similar HTML-based interface 28. Through such an interface 28, an authorized user can establish new rules, revise existing rules, and otherwise make changes to the logic that evaluates a received alarm based on the attributes of that alarm.

With respect to the rules database 26, it is also contemplated that certain authorized personnel could communicate temporary, contrary instructions to the database 26 without necessarily having the full access that would allow changes that in the logic that evaluates received alarms. For example, if a maintenance crew takes a particular network device off-line for a routine repair, it is quite likely that some sort of alarm would be generated by the fault management system 20. This alarm would be evaluated as described above based on certain attributes of the alarm. However, it may not be appropriate to take any action with respect to this alarm since it is a product of routine maintenance on the network device. In other words, there is no need to address this alarm since it is a temporary and intended network condition. Therefore, by allowing maintenance personnel to communicate their actions to the database 26, e.g., taking a particular network device off-line during a specific time period, a temporary, contrary instruction is stored in the database 26. Therefore, after the established set of rules is applied to evaluate the alarm and an appropriate action is identified, as indicated at block 24, there is a subsequent decision 30 made as to whether there are any contrary instructions stored in the database 26. If so, no action is initiated, although the event may be reported or logged for administrative purposes, such as for tracking planned outages or reconciling work orders with actual system events. It is contemplated that each contrary instruction will expire according to a parameter associated with that particular instruction or instruction type (such as, 12 hours after the instruction is created) or according to a global parameter (such as, at the end of each business day). Upon expiration, a contrary instruction may be deleted from the database 26 or simply deactivated.

If there are no contrary instructions, an action is initiated. As mentioned above, at the end of the process of evaluating a particular alarm, an action is identified. Then, in the absence of contrary instructions and as illustrated in the flow chart of FIG. 1, the action is initiated through a task manager, as indicated at block 32. The task manager is a digital computer program that is also preferably resident on the server 25 and is operably connected to and sends commands to network devices and components, including, for example, mobile switching centers (MSC), base station controllers (BSC), operational support systems (OSS), and/or network routers and servers via access protocols that are well-known and understood by one of ordinary skill in the art. Furthermore, to the extent necessary, the task manager may also be configured to query and retrieve data and information from the fault management system 20 that is necessary for initiating and implementing appropriate actions.

Initiation of an appropriate action could involve any of a number of tasks or activities. For example, one preferred action is transmission of instructions directly to a network device, as indicated at block 34. Such instructions might include diagnostic commands for analyzing or addressing a suspected problem of that network device (e.g., send a block/unblock command to the radio, as described above), or may cause the network device to adjust to compensate for problems associated with other network devices.

For another example, notification may be transmitted directly to a technician or other maintenance personnel, as indicated at block 36, preferably with specific instructions for addressing a network problem. Such notifications are preferably electronic in nature, and thus would include email correspondence; digital messaging, and/or paging.

For yet another example, a trouble ticket might be generated, as indicated at block 38. A trouble ticket is used to identify and track a particular network problem. Through automated generation of such a trouble ticket, without the intervention of a NOC operator, prompt attention to an identified network problem is ensured.

With respect to these examples of appropriate actions, it should also be recognized that more than one action could be initiated in response to a particular alarm. Furthermore, as mentioned in the above-described example of a TDMA cellular site that has a radio that drops out of service and stops communicating, alarm counts can be used in order to effectuate escalation of an alarm. In other words, if an identified action does not result in a resolution of the alarm, the second occurrence of the alarm may cause initiation of further actions. Of course, in order to maximize efficiency, it is contemplated and preferred that less expensive, automatic diagnostic and restoral actions be attempted in response to a first occurrence of a particular alarm, with actions that require dispatch of maintenance personnel or generation of trouble tickets being initiated only on subsequent occurrences of an alarm.

With respect to the initiation of any identified action in response to an alarm, it is further contemplated and preferred that a report of same be communicated and reported to the NOC, as indicated by block 40. In this manner, although the NOC operators need not intervene or take action in response to an alarm, the NOC operators can view and follow the actions taken to confirm trouble resolution, preferably through the same interfaces through which they monitor and address more critical alarms and conditions that do require intervention. Similarly, if there is a contrary instruction that prevents an action from being taken (at decision 30) that information is also communicated to and reported to the NOC operators.

In the above description of the method and system of the present invention that follows, it is again important to recognize that the evaluation of alarms, initiation of an appropriate action, and follow-up reporting to the NOC are achieved through the use of a digital computer program. Such a computer program (or similar computer-readable instructions) is preferably installed and stored on a server 25, which is then operably connected to: the fault management system 20 to receive alarms; the database 26 to access the established rules and contrary instructions; and one or more task managers, such an email system or trouble ticketing system, for implementing identified actions in response to a particular alarm. With benefit of the foregoing description, appropriate software coding is readily accomplished by one of ordinary skill in the art.

Thus, the method and system of the present invention provides for the initiation and implementation of certain actions in response to one or more alarms from the fault management system without the need for the intervention of a NOC operator. Filtering or reducing alarm traffic in this manner allows the NOC operators to focus their efforts on addressing more critical faults or network performance issues.

It will be obvious to those skilled in the art that further modifications may be made to the embodiments described herein without departing from the spirit and scope of the present invention.

What is claimed is:

1. A computer-based method for automated handling of alarms generated by a fault management system associated with a telecommunications network in which each alarm has certain attributes, comprising the steps of:

establishing a set of rules for handling each alarm based on certain attributes of that alarm, and storing said set of rules in a computer database;

receiving a particular alarm from the fault management system into a queue;

using a computer in applying the established set of rules stored in the computer database to the particular alarm, such that an action is identified for handling the particular alarm; and initiating said action in response to the particular alarm without intervention of an operator.

2. A method as recited in claim 1, in which applying the established set of rules, identifying an action for handling the particular alarm, and initiating said action are accomplished through execution of a digital computer program resident on a computer-readable program in the computer.

3. A method as recited in claim 1, and further comprising the step of reporting of the initiating of said action to an operator.

4. A method as recited in claim 1, wherein said action is transmission of instructions to a particular network device.

5. A method as recited in claim 1, wherein said action is generation of a trouble ticket.

6. A computer-based method for automated handling of alarms generated by a fault management system associated with a telecommunications network in which each alarm has certain attributes, comprising the steps of:

establishing a set of rules for handling each alarm based on certain attributes of that alarm, and storing said set of rules in a computer database;

providing access to said computer database such that contrary instructions can be communicated to and temporarily stored in said computer database;

receiving a particular alarm from the fault management system into a queue;

using a computer in applying the established set of rules stored in the computer database to the particular alarm, such that an action is identified for handling the particular alarm; and determining whether there is a particular contrary instruction stored in the database, and in the absence of a particular contrary instruction, initiating said action in response to the particular alarm without intervention of an operator.

7. A method as recited in claim 6, in which applying the established set of rules, identifying an action for handling the particular alarm, determining whether there is a particular contrary instruction stored in the database, and initiating said action are accomplished through execution of a digital computer program resident on a computer-readable medium in the computer.

8. A method as recited in claim 6, and further comprising the step of reporting of the initiation of said action to an operator.

9. A method as recited in claim 6, wherein said action is transmission of instructions to a particular network device.

10. A method as recited in claim 6, wherein said action is generation of a trouble ticket.

11. A computer-based system for monitoring and controlling operation of a telecommunications network, comprising:

a fault management subsystem for monitoring operation of the telecommunications network and issuing alarms based on the occurrence of predetermined events;

a computer database for storing rules for handling alarms issued from said fault management subsystem based on certain attributes of such alarms;

a task manager for implementing actions; and a computer for, upon issuance of a particular alarm from said fault management subsystem, applying the rules stored in said computer database in order to identify an appropriate action for handling the particular alarm, said task manager implementing the appropriate action without intervention of an operator.

12. A system as recited in claim 11, in which applying the established set of rules, identifying an action for handling the particular alarm, and implementing the appropriate action are accomplished through execution of a digital computer program resident on a computer-readable medium in the computer.

13. A system as recited in claim 11, wherein said appropriate action is transmission of instructions to a particular network device.

14. A system as recited in claim 11, wherein said action is generation of a trouble ticket.

15. A system as recited in claim 11, wherein access is provided to said database such that contrary instructions can be communicated to and temporarily stored in said database; and wherein when the rules stored in said database have been applied in order to identify an appropriate action for handling the particular alarm, a determination is made as to whether there is a particular contrary instruction stored in the database, and if so, said task manager canceling implementation of the appropriate action.

* * * * *